United States Patent [19]
Aoya

[11] Patent Number: 5,481,388
[45] Date of Patent: Jan. 2, 1996

[54] LIQUID CRYSTAL ELECTRO-OPTICAL DEVICE HAVING COLUMNAR GLASS FIBERS AND GLASS BALLS IN THE SEALING PORTION

[75] Inventor: Osamu Aoya, Tokyo, Japan

[73] Assignee: Seiko Instruments Inc., Tokyo, Japan

[21] Appl. No.: 229,149

[22] Filed: Apr. 18, 1994

[30] Foreign Application Priority Data

Apr. 23, 1993 [JP] Japan .................................. 5-097859

[51] Int. Cl.$^6$ ................................................ G02F 1/1339
[52] U.S. Cl. ................................................ 359/80; 359/81
[58] Field of Search ............................... 359/80, 81, 36, 359/62

[56] References Cited

U.S. PATENT DOCUMENTS

| | | | |
|---|---|---|---|
| 4,983,429 | 1/1991 | Takayanagi et al. | 359/81 |
| 5,105,290 | 4/1992 | Tomii et al. | 359/81 |
| 5,223,964 | 6/1993 | Nagano et al. | 359/81 |

FOREIGN PATENT DOCUMENTS

| | | |
|---|---|---|
| 77420 | 7/1976 | Australia . |
| 2219478 | 9/1974 | France . |
| 2258643 | 8/1975 | France . |
| 54-107751 | 8/1979 | Japan . |
| 60-101520 | 6/1985 | Japan ................................. 359/81 |
| 62-218937 | 9/1987 | Japan . |
| 2-220032 | 9/1990 | Japan ................................. 359/81 |
| 5-011528 | 1/1993 | Japan ................................. 359/81 |
| 5-034682 | 2/1993 | Japan ................................. 359/81 |

OTHER PUBLICATIONS

European Search Report, Jul. 29, 1994, Appl. No. 94105637.6.

Primary Examiner—William L. Sikes
Assistant Examiner—Tai V. Duong
Attorney, Agent, or Firm—Loeb & Loeb

[57] ABSTRACT

A uniform gap thickness is maintained in a liquid crystal cell by introducing, into a sealing portion of the cell, between two substrates, glass balls having a diameter substantially equal to the desired gap space between the substrates and columnar glass fibers. The combination of the balls and the fibers enables the quality of the image produced by the liquid crystal cell to be improved. In particular, the image quality is made more uniform in color tome and contrast.

8 Claims, 1 Drawing Sheet

LIQUID CRYSTAL ELECTRO-OPTICAL DEVICE HAVING COLUMNAR GLASS FIBERS AND GLASS BALLS IN THE SEALING PORTION

BACKGROUND OF THE INVENTION

1. Field of Invention

This Invention relates to controlling gap thickness of a liquid crystal electro-optical device.

2. Prior Art

FIG. 2 shows a sealing portion structure of a conventional liquid crystal electro-optical device. Glass fiber 3 are included in sealing material 2 for determining and maintaining a sealing portion gap thickness h, and liquid crystal 6 is sealed between upper and lower substrates 1 having transparent electrode films thereon.

Sealing material 2 includes glass fiber 3 of 1 wt % to sealing material, and the diameter of the glass fibers 3 is about 0.4 μm bigger than the desired thickness of the sealing gap for controlling its thickness. A pressure of 0.8 kg/cm$^2$ is applied to form the sealing portion.

However, the actual gap at the sealing portion usually becomes 0.1 μm to 0.2 μm narrower than the desired gap; thereby, gap the thickness difference between cell gap k and sealing portion gap h becomes about 0.2 μm to 0.3 μm which causes defects such as uneven tone in a liquid crystal electro-optical display.

If the desired gap thickness is 7.0 μm, 1 wt % of 7.4 μm glass fibers should be included in the sealing material and a pressure of 0.8 kg/cm$^2$ is required to seal the substrates; however, actual cell gap thickness results 6.8 μm to 6.9 μm.

Problems to be solved by the Invention

Super Twisted Nematic mode is mostly used for a liquid crystal electro-optical device because of its superiority of electro-optical characteristics. Uniformity of cell gap thickness is one of the most important qualities required for a liquid crystal cell.

As FIG. 2 shows, cell gap thickness means the gap distance between upper and lower glass substrates and the gap is held by having spacers 5 in display area and glass fibers 3 included in the sealing material 2. Uniformity required for cell gap thickness should be within ±0.1 μm. Without this cell gap uniformity, problems are caused, such as irregular tone or bad contrast in liquid crystal electro-optical devices.

As FIG. 2 shows, gap difference exists between cell gap thickness k and sealing portion gap thickness h. This difference causes is created at the time of crimping, and the sealing portion gap thickness becomes 0.1 μm to 0.2 μm smaller than the desired gap thickness. Even if bigger particles of glass fiber are used, cell gap thickness is still uneven or worse, which makes color tone differences greater between the tone of the display area and that of the margin area. It was is very difficult to hold the whole cell gap uniform.

SUMMARY OF THE INVENTION

In order to make cell gap thickness uniform of a liquid crystal electro-optical device, in addition to glass fiber included in the sealing portion, good quality glass balls having diameter equal to the desired gap dimension are mixed in the sealing material.

By mixing conventional glass fibers and this invention's glass balls having the same diameter as the desired gap thickness with the sealing material, the glass balls regulate cell gap thickness and create a uniform gap.

DETAILED DESCRIPTION OF THE PREFERRED EMBODIMENTS

The invention is described using Figures in this embodiment.

Figure 1:
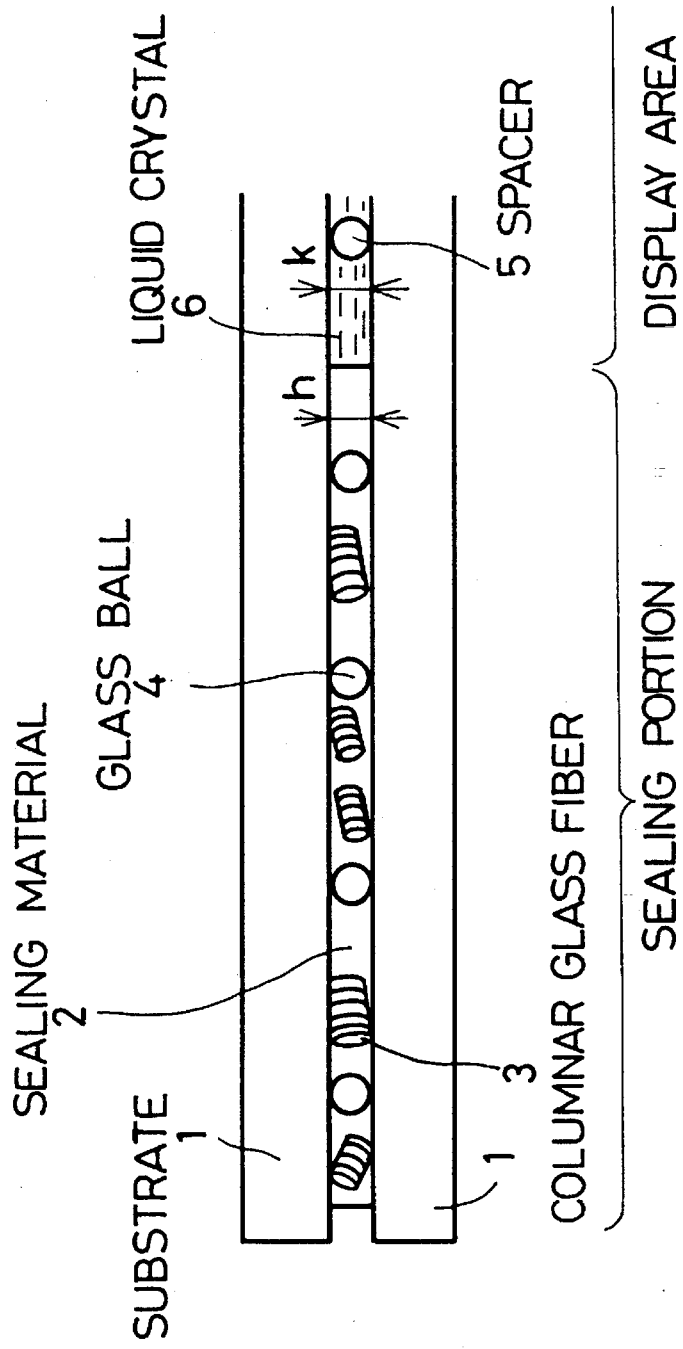
FIG. 1 shows a sectional view of a liquid crystal cell according to the invention in liquid crystal electro-optical device.
Figure 2:
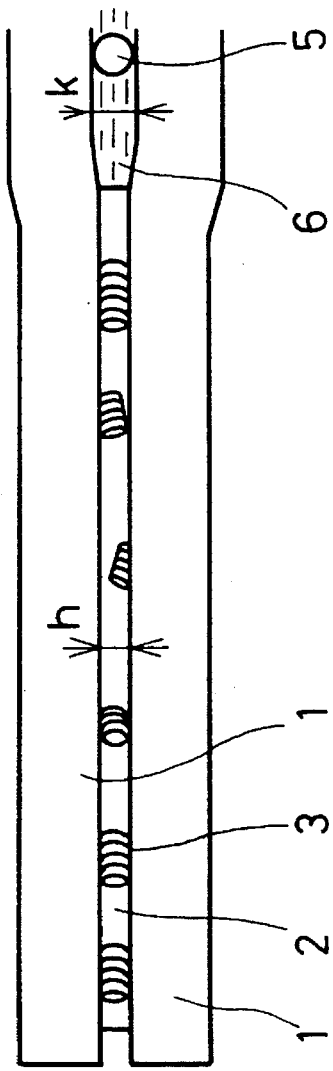
FIG. 2 shows a sectional view of a liquid crystal cell of a conventional liquid crystal electro-optical device.

FIG. 1 shows a sectional view of this invention's liquid crystal electro-optical device.

In order to hold a desired gap thickness h at a sealing portion between upper and lower glass substrates 1, 1 wt % of glass fibers 3 being 0.3 μm to 0.5 μm bigger than desired gap thickness and 1.5 wt % of glass balls 4 being of the same size as gap thickness are included in epoxy group sealing material 2 at the sealing portion. In the display area, display area spacers 5 such as plastic balls and so on, are the same size as cell gap thickness K in order to hold cell gap thickness.

The followings are standard deviation, of each gap material particle size.

Glass fiber: 0.08 to 0.12 μm

Glass ball: 0.05 to 0.08 μm

The above glass fibers 3 and glass balls 4 are included in the sealing portion and the upper and lower substrates are crimped together at 0.8 kg/cm$^2$ of pressurization.

For example, if 7.0 μm gap thickness is desired, 1 wt % of 7.4 μm glass fibers 3 and 1.5 wt % of 7.0 μm glass balls 4 should be included in the epoxy group sealing material, which should be coated at thickness of 30 μm, and also, 7.0 μm plastic balls 5 are dispersed in the cell display area, and then, upper and lower substrates 1 are laminated and crimped together by pressurization of 0.8 kg/cm$^2$.

If only 3 wt % of glass balls 4 are included in the sealing material, glass balls cannot bear pressure from tile substrates and then, will be broken down, since the contact areas of the glass balls to support the substrates are only dots. On the other hand, the contact areas of the glass fibers to support the substrates are bigger than ones of the glass balls since the glass fibers, having circular cylinder shape, are very flexible to be crushed to provide more contacting area s in order to support cell gaps between the substrates. Thereby, glass fiber can function as buffering pressure at the time of crimp, and also, glass balls can function as regulating gap thickness as a stopper.

Effect of the invention

The invention, as described above, by including glass balls in the sealing material in addition to the conventional glass fiber, enables desired uniform cell gap thickness of a liquid crystal electro-optical device, which resolves the problems such as color tone difference between sealing portion and display area, and enables uniform color tone and contrast.

What is claimed is:

1. A liquid crystal electro-optical device comprising:

upper and lower substrates having transparent electrodes on facing surfaces, a part of said device constituting a sealing portion in which a gap having a given thickness exists between said substrates; and a sealing material containing a plurality of columnar glass fibers and a plurality of glass balls in said gap in said sealing portion, wherein said glass balls have a diameter substantially equal to the given thickness of said gap.

2. A device as defined in claim 1 wherein said device is formed by pressing said substrates together with said sealing material disposed between said substrates in said sealing region, and said columnar glass fibers initially have, prior to being placed in said gap, a circular cross section with a diameter greater than the given thickness of said gap and are crushed when said upper and lower substrates are pressed together.

3. A device as defined in claim 2 wherein said sealing material contains 1 wt % of said glass fibers.

4. A device as defined in claim 3 wherein said sealing material contains 1.5 wt % of said glass balls.

5. A device as defined in claim 1 wherein said sealing material contains 1 wt % of said glass fibers.

6. A device as defined in claim 5 wherein said sealing material contains 1.5 wt % of said glass balls.

7. A device as defined in claim 2 wherein the given thickness of said gap is 7µ, the diameter of said balls is 7µ and the diameter of said glass fibers, prior to being placed in said gap, is 7.4µ.

8. A device as defined in claim 1 wherein said sealing material is constituted by a unitary mass of material in which said glass fibers and glass balls are mixed.

* * * * *